US009292992B2

United States Patent
Girard et al.

(10) Patent No.: US 9,292,992 B2
(45) Date of Patent: Mar. 22, 2016

(54) SIMPLIFIED SMARTCARD PERSONALIZATION METHOD, AND CORRESPONDING DEVICE

(75) Inventors: Pierre Girard, La Destrousse (FR); Hamid Choukri, Saint Cyr sur Mer (FR)

(73) Assignee: GEMALTO SA, Meudon (FR)

( * ) Notice: Subject to any disclaimer, the term of this patent is extended or adjusted under 35 U.S.C. 154(b) by 91 days.

(21) Appl. No.: 13/820,158

(22) PCT Filed: Aug. 10, 2011

(86) PCT No.: PCT/EP2011/063786
§ 371 (c)(1),
(2), (4) Date: Mar. 1, 2013

(87) PCT Pub. No.: WO2012/031848
PCT Pub. Date: Mar. 15, 2012

(65) Prior Publication Data
US 2013/0166902 A1 Jun. 27, 2013

(30) Foreign Application Priority Data
Sep. 6, 2010 (EP) .................................. 10305956

(51) Int. Cl.
*G06F 7/10* (2006.01)
*H04L 9/08* (2006.01)
*G06Q 20/34* (2012.01)
*G06Q 20/38* (2012.01)
(Continued)

(52) U.S. Cl.
CPC ............ *G07F 7/1008* (2013.01); *G06Q 20/341* (2013.01); *G06Q 20/3558* (2013.01); *G06Q 20/3823* (2013.01); *G06Q 20/3827* (2013.01); *G07F 7/1075* (2013.01); *H04L 9/0863* (2013.01)

(58) Field of Classification Search
CPC . H04W 12/06; H04L 63/083; H04L 63/0853; H04L 63/08; H04L 9/3234; H04L 63/10; H04L 63/20; H04L 9/0844; H04L 9/0863; G07F 7/0846; G07F 7/0853; G07F 7/1025; G07F 7/1008; G06F 21/31; G06F 21/83; G06F 21/62; G06F 21/71
See application file for complete search history.

(56) References Cited

U.S. PATENT DOCUMENTS 5,623,637 A * 4/1997 Jones et al. .................. 711/164
5,721,781 A  2/1998 Deo et al.
5,745,571 A  4/1998 Zuk
(Continued)

FOREIGN PATENT DOCUMENTS

DE  101 17 445 A1  7/2002
WO  WO 99/18533 A1  4/1999
WO  WO 00/74007 A1  12/2000

OTHER PUBLICATIONS

International Search Report (PCT/ISA/210) issued on Sep. 6, 2011, by the European Patent Office as the International Searching Authority for International Application No. PCT/EP2011/063786.
(Continued)

*Primary Examiner* — Darren B Schwartz
(74) *Attorney, Agent, or Firm* — Buchanan Ingersoll & Rooney PC

(57) ABSTRACT

The invention relates to a method for personalizing an electronic device using an encryption device adaptable to standard certified apparatuses. The encryption device makes it possible to ensure the confidentiality of the transfer of a secret code from the user to a possible personalization server.

16 Claims, 1 Drawing Sheet

(51) Int. Cl.
*H04L 29/06* (2006.01)
*G07F 7/10* (2006.01)

(56) References Cited

U.S. PATENT DOCUMENTS

| | | | |
|---|---|---|---|
| 8,225,386 B1* | 7/2012 | de Jong | 726/9 |
| 2001/0054148 A1* | 12/2001 | Hoornaert | E21B 41/0042 |
| | | | 713/172 |
| 2002/0087867 A1* | 7/2002 | Oberle et al. | 713/183 |
| 2003/0004877 A1* | 1/2003 | Kasasaku | 705/41 |
| 2003/0111528 A1* | 6/2003 | Sato | G06Q 20/105 |
| | | | 235/380 |
| 2003/0163688 A1 | 8/2003 | Tanaka et al. | |
| 2003/0177353 A1* | 9/2003 | Hiltgen | 713/161 |
| 2003/0177392 A1* | 9/2003 | Hiltgen | 713/201 |
| 2003/0204732 A1* | 10/2003 | Audebert et al. | 713/182 |
| 2004/0059916 A1* | 3/2004 | Mizushima et al. | 713/172 |
| 2004/0250139 A1* | 12/2004 | Hurley | 713/202 |
| 2005/0055318 A1* | 3/2005 | Ziegler | 705/72 |
| 2005/0071282 A1 | 3/2005 | Lu et al. | |
| 2005/0077349 A1* | 4/2005 | Bonalle | G06Q 10/04 |
| | | | 235/380 |
| 2005/0172137 A1* | 8/2005 | Hopkins | G06Q 20/02 |
| | | | 713/185 |
| 2006/0248345 A1* | 11/2006 | Ishidera | 713/183 |
| 2007/0006301 A1* | 1/2007 | Nickell et al. | 726/22 |
| 2007/0130463 A1* | 6/2007 | Law et al. | 713/168 |
| 2007/0282756 A1* | 12/2007 | Dravenstott et al. | 705/72 |
| 2009/0026260 A1* | 1/2009 | Dressel et al. | 235/380 |
| 2009/0031408 A1* | 1/2009 | Thom et al. | 726/9 |
| 2009/0049306 A1* | 2/2009 | Dharmarajan | 713/183 |
| 2009/0158406 A1* | 6/2009 | Jancula et al. | 726/5 |
| 2011/0055586 A1* | 3/2011 | Lupton et al. | 713/184 |
| 2011/0131639 A1* | 6/2011 | Buhler et al. | 726/6 |
| 2013/0144792 A1* | 6/2013 | Nilsson et al. | 705/67 |

OTHER PUBLICATIONS

Written Opinion (PCT/ISA/237) issued on Sep. 6, 2011, by the European Patent Office as the International Searching Authority for International Application No. PCT/EP2011/063786.

* cited by examiner

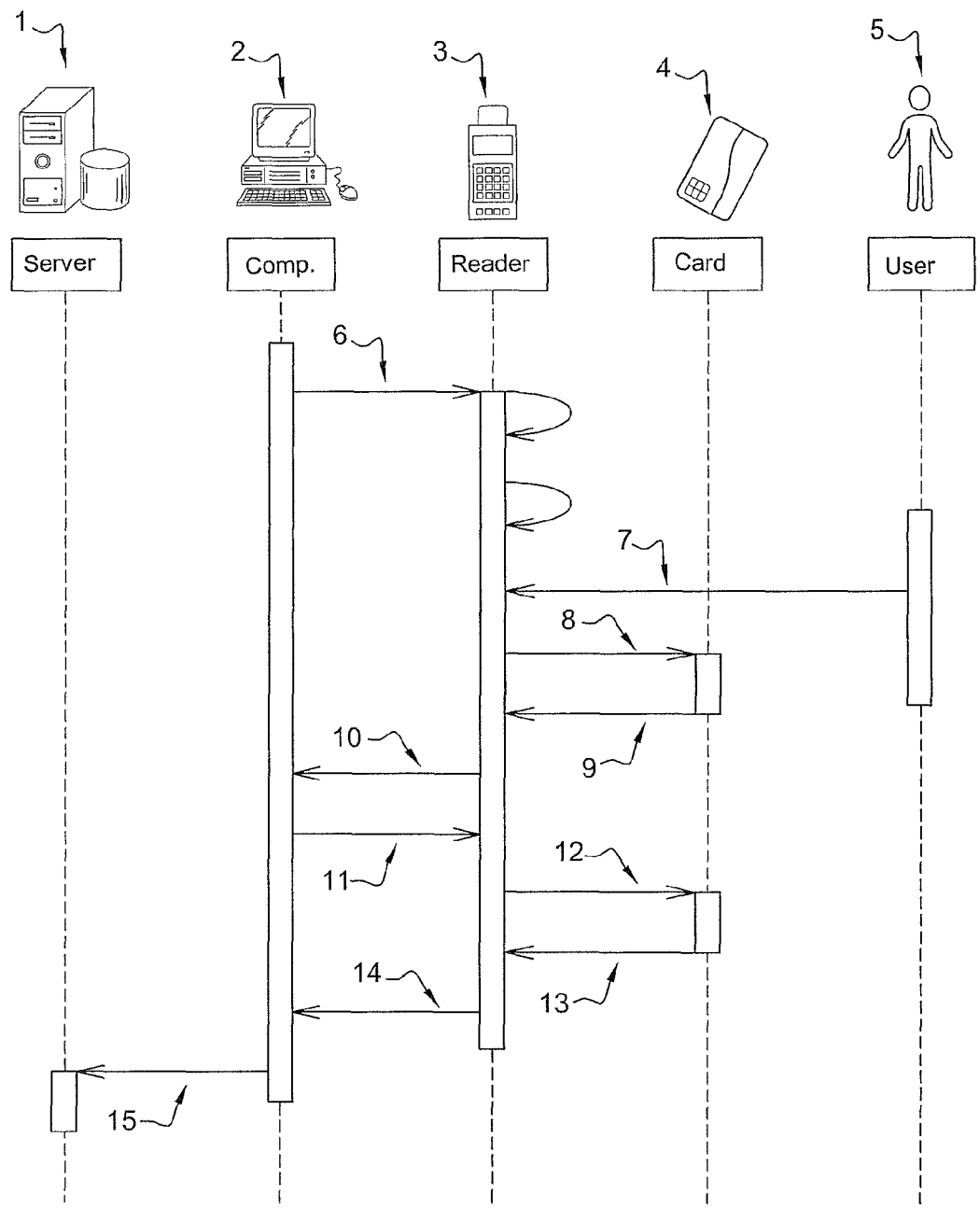

SIMPLIFIED SMARTCARD PERSONALIZATION METHOD, AND CORRESPONDING DEVICE

FIELD OF THE INVENTION

The invention relates to a simplified method for personalizing a smart card.

The invention more particularly relates to a method making it possible to input personalizing information through a standard smart card reader, while maintaining the highest security level.

BACKGROUND OF THE INVENTION

Mobile electronic devices know an expansion which goes together with miniaturizing. Today, electronic devices can be hand-held, and have more computational ability than a few years old desktop computers.

This concomitant evolution in miniaturizing devices and enhancing their capacity opened up new horizons as regards applications.

Today, a mobile phone or a music player can execute cryptographic operations, and encode or decode information.

As the spearheads of the evolution of embedded electronic devices, microchips experience this evolution in their applications.

Microchips are currently embedded in a large number of devices. They can be found in smart cards of course, and also in electronic identity documents, in smart self-adhesive labels, etc.

Such microchips (also commonly called "computing unit") provide particularly high security performances, which of course made it possible to concentrate the utilization thereof on security, or at least secure applications.

Microchips are thus commonly used for governmental or bank operations, etc.

All these applications are based on a particularly important step: personalizing. This step is the one during which data, and more particularly secrets, are inserted into the chip.

Some of these secrets may be linked with the final user. Such a secret may also be a secret code, for instance. The secret code, also called PIN CODE (for Personal Identification Number CODE) enables the legitimate user to identify with the chip. In the case of a bank card, requesting the user to give his/her secret code prior to a transaction is a common practice, in order to make sure he/she is entitled to request said transaction.

To carry out such operation:
the card is inserted into a terminal,
the terminal prompts the user to input his/her secret code
the terminal sends the input code to the card and requests therefrom the identification of the code,
the card verifies the code and informs the terminal of the result of such verification.

To be able to verify the code submitted, the card must know all or part of such code. In a naive implementation, the card knows the code as such and compares it with the input code. In a more advanced embodiment, the card has some information on the code (for instance a hash-based code) and searches for the same information in the input code.

In any case, the card needs to know all or part of the code to be able to verify it.

The significant diversification of the electronic devices as well as the applications thereof induced a remarkable increase in the number of secret codes to be memorized by each user. This phenomenon among other things favoured the necessity, for the users, to choose their secret codes by themselves, in order to memorize these more easily.

Then the problem consists in having the user participate in an extremely secure personalizing process, most often centralized in protected places.

The first considered solution consisted in establishing a remote communication between the personalizing centre and the user. For this step, as the user was generally in a branch, for instance a bank or a governmental branch, this meant establishing a secure communication between the personalizing centre and all the branches.

This solution was soon discarded because of the major risk entailed in so many potential entries into a secure personalizing system.

The second studied solution was the equipment of each branch, with a secure encryption unit, generally called HSM, for Hardware Security Module. Such hardware security module makes it possible to encrypt data in a secure environment, and thus to be able to transmit same subsequently.

In a broader sense, a HSM (Hardware Security Module) is a device considered as tamper-proof providing cryptographic functions. This device is an electronic item of equipment providing security service which generally consists in generating, storing, using and protecting cryptographic keys.

In this case, the data to be encrypted are data provided by the final user, for instance his/her secret code.

After the transmission of data to the personalizing centre, the latter has resources to decrypt these (most often another HSM) and can thus analyze and process such data.

The problem met by this solution lies in the extremely high cost of such HSMs.

Besides, using new devices in the personalizing chain requires a new certification of said chain. As a matter of fact, such extremely secure processes are submitted to a set of tests and validations called "certification". Such a "label" guarantees all the participants that experts checked the security of the whole system.

Yet, the insertion of the HSM, or of any other device into such chain requires a new certification, which is extremely expensive.

SUMMARY OF THE INVENTION

The present invention thus tends to provide a personalizing method, including the final user, without modifying the devices in the personalizing chain.

First, the invention describes a method for personalizing an electronic device also called a target, using a secure terminal, as well as a communicating electronic device also called a computer, able to execute a computer program also called a personalization program, such method comprising the following steps:

Inserting a secure electronic device also called encryption device into said terminal Sending by the personalization program of a request by which it requests the terminal to submit a code to the encryption device The user inputs a secret code also called the "provided code" using the keyboard of the terminal, and said secret code is transmitted to the encryption device through a request REQ The provided code is saved in a memory of the encryption device The personalization program sends a <<Get-encrypted-Pin>> command to the encryption device through the terminal The encryption device encrypts said provided code using a cryptographic algorithm ALG and a key K to obtain an "encrypted provided code"

The encrypted provided code is transmitted to the personalizing program.

The request REQ may be a request to verify the provided code.

Such encrypted provided code may then be transmitted to a remote personalization server.

The personalizing method may further include a step of verifying during which, when the encryption device receives the provided code, at least one security rule is analyzed.

The encryption device may send back to the personalizing program, through the terminal, a different response according to the result of the application of the security rule. Such security rule may for instance consist in verifying the format of the provided code.

Secondly, the invention also describes a secure electronic device including a non-volatile memory, a cryptographic key K, a cryptographic algorithm ALG, characterized in that it has means for:

saving a provided code in the internal memory within the framework of a command to verify the provided code encrypting the provided code by applying the algorithm ALG and the key K in order to obtain an "encrypted provided code"

sending the "encrypted provided code" in response to a <<get encrypted pin>> command.

Such device may include means making it possible to change the context, a processing specific to the command making it possible to verify the accuracy of the provided code being associated with each one of said contexts.

Such device may also include at least one security rule in a non-volatile memory. Such security rule may, for instance, consist in verifying that the size of the provided code falls within predefined boundaries Bmin and Bmax, by verifying that the characters composing the provided code are not identical, or by verifying that the characters composing the provided code do not form a factor one arithmetic sequence.

One advantage of the invention is that an adaptation of the personalizing chain according to the invention can be made for a very low cost. As a matter of fact, the cost of management devices, (also called encryption devices) and more particularly smart cards if this format is preferred, is completely different from the equipment with HSMs of all the branches.

BRIEF DESCRIPTION OF THE DRAWINGS

Other characteristics and advantages of the invention are mentioned in details in the following description which is indicative and not restrictive while referring to the appended drawings, in which:

FIG. 1 shows a sequence diagram illustrating the method according to the invention.

DETAILED DESCRIPTION OF THE DRAWINGS

Now almost all the points of sale liable to implement the personalizing method according to the invention are already provided with a computer 2, a smart card reader 3 and a digital connection.

The present invention provides for the utilization of a secure electronic device 4, also called an "encryption device", for instance a smart card. Such encryption device is able to receive at least 2 commands: a command 8 making it possible to verify the accuracy of a provided code 7 and a <<get-encrypted-pin>> command 12.

The verification command 8 may for instance be the "verify pin" command (ISO 7816-4):

The Verify Pin command launches the comparison, within the card, of the verification data sent by the interface device with the reference data stored in the card, for instance a password.

The <<get-encrypted-pin>> command 12 will enable the card to send back 13 the encrypted value of the provided code 7.

Such command will preferably be sent by the computer 2 through the reader 3. If so required, the command will be encapsulated in a generic command of the reader to enable communication with the card.

In one embodiment, the Get Encrypted Pin command is able to send back the encrypted PIN if and only if the verification command 8 has been executed beforehand.

The encryption device 4 is however able to process these commands in an original way.

As a matter of fact, in one so-called personalizing embodiment according to the invention, said encryption device, upon receiving the "verify pin" command, saves the provided pin code as a parameter, in an internal memory. It answers back with an arbitrary answer, for instance "OK", which means that the verify pin has been correctly executed and that the result is positive.

Upon receiving the Get-Encrypted-Pin command 12, the encryption device encrypts said provided pin code 7, using a cryptographic algorithm ALG, and a key K.

Such encryption may be executed using any encryption means known to the person skilled in the art, more particularly using a symmetric or an asymmetric algorithm.

Symmetric cryptography or secret key cryptography is based on the shared knowledge of a secret by two participants.

The algorithms used, such as for instance DES, 3DES, AES, . . . are based on the fact that it is almost impossible, when you know the encryption of a message, to find the plain message without knowing the key used for the encryption.

Asymmetric cryptography or public key cryptography is based on the existence of irreversible functions.

Public key cryptography is thus an asymmetric key system using a pair of keys. Such keys, generally called "public key" and "private key" are so designed that what has been encrypted with one key can only be decrypted by the second one.

It should be noted that it is impossible to guess the private key from the public key.

Generating public key/private key pairs is not the object of the present invention. All the methods described in the state of the art, or future ones which make it possible to obtain such key pairs apply to the present invention.

Keys of the "group encryption" type, which make it possible to associate several private keys with one public key, with each one making it possible to decrypt the whole or a part of what has been encrypted with the public key, can be perfectly applied to the present invention.

In answer to the get encrypted pin command, the encryption device thus answers back said encrypted provided pin code.

In a preferred embodiment, the encryption device 4 includes security and authentication mechanisms such as those known to the person skilled in the art, making it possible to verify the user's identity.

A solution particularly adapted to the present invention consists in creating utilization contexts. As a matter of fact, on log-on, for instance when powering on the encryption device, the <<verify pin>> command has a so-called standard operation (standard context), complying with the description thereof in 7616-4 (or ETSI102-221) standards. When the user's authentication is successful, the device may automatically or to order, switch to a so-called encryption context according to the invention. In this embodiment, the "verify pin" command operates according to the invention as described above.

In an exemplary utilization illustrated in FIG. 1, for instance, a user 5 goes to the counter of a bank to select the pin code of a future bank card.

The financial adviser in charge of this personalizing operation inserts his/her own encryption card 4 into the smart card reader 3.

A personalizing program according to the invention is executed on the computer 2 which said smart card reader is connected to.

The program sends the card reader a pin code 6 verify command (verify pin). The reader switches to the secure mode, and waits for a candidate pin code.

The user 5 inputs, on the secure keyboard of the card reader, the pin code 7 he/she wishes to be inserted into his/her future bank card.

The provided pin code 7 is transmitted to the encryption card as a parameter of the pin code verification command 8.

The encryption card 4 then saves the provided pin code 7 in its internal memory.

In a simple embodiment of the invention, the encryption card sends back an arbitrary answer 9, for instance OK.

In a more advanced embodiment of the invention, the card may advantageously contain a set of provided pin code verification rules, in order to make sure that the predefined security rules are complied with. For instance, the card may verify that the number of digits composing the provided pin code falls within the predefined Bmin boundary and Bmax boundary. Such boundaries may be predefined in the security rule, or transmitted by the personalizing program executed on said computer, for instance as a parameter of the verify-pin command.

Such security rules may also verify that all the digits composing the provided code are not identical, or that they do not form a trivial mathematical sequence, for instance a factor one arithmetic sequence, etc.

In this embodiment, the card answers back, in response to the pin code verification command OK if the rules are complied with, KO if they are not. This answer is transmitted by the card reader to the personalizing program according to the invention which is executed on the computer.

In one embodiment, the encryption card may, further to a positive verification of the pin code, switch to a third context, i.e. a confirmation context.

In this context, the card will wait for at least a new pin code verification command, and verify that the provided pin codes are really identical. This new pin code verification will be considered as successful if the provided pin code is really identical to the one provided beforehand. For optimization purposes, and in case security rules are applied to the provided pin code, such rules may advantageously be applied only to the first provided pin code, with the following ones just having to be identical to said first provided pin code.

Such context makes it possible to avoid keying errors when inputting the pin code.

For safety reasons, a preferred embodiment of the invention includes, at this stage of the method, a return to the standard context, in order to confirm once again the identity of the employee holding the encryption card.

The personalizing program executed on the computer 2 then makes a <<get encrypted pin code>> request 11, 12 through the smart card reader 3. Upon receiving such command, the encryption card 4 sends back the provided pin code, encrypted 13 with a cryptographic algorithm, and a key.

All the mechanisms known to the person skilled in the art and making it possible to optimize the encryption security may advantageously be implemented. More particularly a derivation of the key, in order not to systematically use the same key, the insertion of variables into the encryption computing, or the utilization of an OTP ("One Time Password") in said encryption. An OTP is a generated value which is used only once.

All the mechanisms making it possible to enhance the system security, while guaranteeing the subsequent decryption of the data item by an authorized device can be implemented.

Such encryption makes it possible for the entered pin code never to be shown in plain, outside the card. Thus the user is the only one to know the value of such pin code. The financial adviser executing the operation has no way to obtain it.

The encrypted pin code 13 is transmitted by the encryption card to the smart card reader, which transmits 14 it in turn to the personalizing program executed on the computer.

The computer can then transmit 15 the encrypted pin code to the data processing server 1 in charge of the final personalization of the future smart card, called target. Such server 1 has the cryptographic means required for decrypting said pin code, under optimal safety conditions. A HSM (Hardware Security Module) connected to this server is particularly adapted to such step of the method.

A HSM is a secure electronic device, and assures the safest guarantee of privacy and of security.

Such transmission may be performed by any means known to the person skilled in the art as enabling the exchange of digital data. In a preferred embodiment, such transmission is performed in a secure mode, through networks.

The invention claimed is:

1. A method for enabling a user to provide a previously undetermined secret code to a personalizing program for personalizing a target electronic device not yet provided to the user, the method comprising:
    receiving, by a secure terminal, a secure electronic encryption device, wherein said secure electronic encryption device is inserted within said secure terminal and is distinct from the target electronic device to be personalized;
    receiving, by the secure terminal, a code request from a personalizing program stored on an external communicating electronic device, wherein said code request requests said secure terminal to submit an undetermined code to said secure electronic encryption device inserted therein;
    receiving, via a keyboard of said secure terminal, input of a user-provided code;
    transmitting, by said secure terminal, said user-provided code, as the requested undetermined code, to the secure electronic encryption device, inserted therein, through a request REQ;
    storing said user-provided code in a memory of said secure electronic encryption device inserted in the secure terminal;
    receiving, by the secure electronic encryption device inserted in the secure terminal, a <<Get-encrypted-Pin>> command from the personalizing program stored on the external communicating electronic device, via said secure terminal, said <<Get-encrypted-Pin>> command requesting encryption of said user-provided code;
    encrypting, by said secure electronic encryption device inserted in said secure terminal, said user-provided code using a cryptographic algorithm ALG and a key K to obtain an encrypted user-provided secret code; and prior to personalization of the target electronic device with the encrypted user-provided secret code, transmitting, from said secure electronic encryption device, via said secure terminal and said external communicating electronic device, said encrypted user provided secret code to a data processing server for personalizing said target electronic device not yet provided to the user.

2. The method according to claim 1, wherein said request REQ is a command to verify said user-provided code.

3. The method according to claim 2, further including a step of verifying during which, when said secure electronic encryption device receives said user-provided code, at least one security rule is analyzed.

4. The method according to claim 1, wherein said encrypted user-provided code is transmitted to a remote personalization server.

5. The method according to claim 4, further including a step of verifying during which, when said secure electronic device receives said user-provided code, at least one security rule is analyzed.

6. The method according to claim 1, further including a step of verifying during which, when said secure electronic encryption device receives said user-provided code, at least one security rule is analyzed.

7. The method according to claim 6, wherein said secure electronic encryption device returns to said personalizing program stored on the external communicating electronic device, through said secure terminal, a different response according to the result of the application of said security rule.

8. The method according to claim 7, wherein said security rule comprises verifying a format of said user-provided code.

9. The method according to claim 7, wherein said security rule comprises verifying a format of said user-provided code.

10. A system for enabling a user to provide a previously undetermined secret code to a personalizing program, said system enabling encryption of a previously undetermined secret code provided by the user for personalization of a target device not yet provided to the user, said system comprising:

a secure terminal configured to (i) receive a code request from a personalizing program stored on an external communicating electronic device to submit an undetermined code, (ii) request input of a user-provided code in response to said code request and (iii) receive input of the user-provided code as the requested undetermined code;

a secure electronic encryption device configured to be inserted into the secure terminal and including a non-volatile memory, a cryptographic key K, and a cryptographic algorithm ALG, wherein said secure electronic encryption device is distinct from the target device to be personalized and includes means for storing the user-provided code, means for receiving a <<Get-encrypted-Pin>> command from the personalization program of the external communicating electronic device, said <<Get-encrypted-Pin>> command requesting encryption of said user-provided code, means for encrypting said user-provided code, in response to said received <<Get-encrypted-Pin>> command, by applying said algorithm ALG and said key K in order to obtain an encrypted user-provided secret code, and means for sending, prior to personalization of the target device with the encrypted user-provided secret code, said encrypted user-provided secret code, via said secure terminal and said external communicating electronic device, to a data processing server for personalizing said target device not yet provided to the user.

11. The system according to claim 10, wherein the secure electronic encryption device further including means to change context, wherein a processing specific to the command verifies the user-provided code associated with each one of said contexts.

12. The system according to claim 11, wherein said secure electronic encryption device further includes at least one security rule in a non-volatile memory.

13. The system according to claim 10, wherein the secure electronic encryption device further includes at least one security rule in a non-volatile memory.

14. The system according to claim 13, wherein said security rule comprises verifying that a size of said user-provided code is included within predefined boundaries Bmin and Bmax.

15. The system according to claim 13, wherein said security rule comprises verifying that characters composing said user-provided code are not identical.

16. The system according to claim 13, wherein said security rule verifying that characters composing said user-provided code do not form a factor one arithmetic sequence.

* * * * *